C. REDD.
WEIGHING AND FILLING MACHINE.
APPLICATION FILED OCT. 7, 1912.

1,126,083.

Patented Jan. 26, 1915.
11 SHEETS—SHEET 1.

Fig. 1.

Witnesses:
Charles O. Shurley
G. F. Chase

Inventor:
Charlie Redd,
By Dyrenforth, Lee, Chritton & Wiles
his Attorneys

C. REDD.
WEIGHING AND FILLING MACHINE.
APPLICATION FILED OCT. 7, 1912.

1,126,083.

Patented Jan. 26, 1915.
11 SHEETS—SHEET 3.

Witnesses
Charles C. Shurvey
G. F. Chase

Inventor:
Charlie Redd,
by Dyrenforth, Lee, Chritton and Wiles,
his Attorneys.

C. REDD.
WEIGHING AND FILLING MACHINE.
APPLICATION FILED OCT. 7, 1912.

1,126,083.

Patented Jan. 26, 1915.
11 SHEETS—SHEET 5.

Witnesses:
Charles O. Shurney
G. F. Chase

Inventor:
Charlie Redd,
by
Dyrenforth, Lee, Chritton & Wiles,
his Attorneys

C. REDD.
WEIGHING AND FILLING MACHINE.
APPLICATION FILED OCT. 7, 1912.

1,126,083.

Patented Jan. 26, 1915.
11 SHEETS—SHEET 6.

C. REDD.
WEIGHING AND FILLING MACHINE.
APPLICATION FILED OCT. 7, 1912.

1,126,083.

Patented Jan. 26, 1915.
11 SHEETS—SHEET 10.

UNITED STATES PATENT OFFICE.

CHARLIE REDD, OF CHICAGO, ILLINOIS, ASSIGNOR OF ONE-HALF TO ISAAC PIESER AND ONE-HALF TO CHARLES G. LIVINGSTON, OF CHICAGO, ILLINOIS.

WEIGHING AND FILLING MACHINE.

1,126,083.  Specification of Letters Patent.  Patented Jan. 26, 1915.

Application filed October 7, 1912. Serial No. 724,370.

*To all whom it may concern:*

Be it known that I, CHARLIE REDD, a citizen of the United States, residing at Chicago, in the county of Cook and State of Illinois, have invented a new and useful Improvement in Weighing and Filling Machines, of which the following is a specification.

My object is to provide a machine of improved construction which will operate automatically to fill cartons or other packages, with accurately-weighed charges of pulverulent or granular merchandise, and perform the filling and weighing operations with great speed and certainty.

In the operation of the machine the cartons, or the like, which are to be filled, are moved into the machine by a conveyer-belt and transferred from said belt onto a scale-pan. This scale-pan is suspended from a scale-beam and extends below a receptacle having at its lower end a valve and above it means to feed the merchandise into it in a nearly constant stream. During the time when the packages are being fed, the valve is closed and the receptacle acts as a reservoir in which the constantly fed material accumulates (but in quantity less than is required to fill the package) and when a package reaches the scale-pan the valve opens and the accumulated merchandise enters the receptacle. The constant feed goes on uninterruptedly through the open receptacle, which now acts merely as a guiding tube or chute until the beam tilts, whereupon the valve closes and the carton is shifted onto an endless belt which removes it, and in the meantime, and until another carton reaches the scale-pan, the merchandise constantly fed accumulates in the receptacle. By this feeding it is possible to use a feed slow enough for accurate weighing, and yet, as it operates constantly but is gathered from time to time into a rapidly discharged receptacle, the cartons may be filled very rapidly.

In the accompanying drawings which show my improvements in a machine for filling cartons with flour, meal, or other pulverulent merchandise

The main frame of the machine consists of the four corner posts 45 connected together by cross-braces, as shown. Mounted in the upper part of the main frame is a hopper 46 terminating at its lower end in a vertical downwardly-extending cylindrical measuring-receptacle or chute 47. Sliding in guides 48 on the main frame is a vertically-reciprocating frame consisting of side-rods 49, a lower cross-head 50, and an upper cross-head 51. Journaled at its upper end in a central bearing 52 carried by the upper cross-head 51, is a vertical shaft 53. On the top of the main frame is a stationary bracket 54 provided in its end, centrally above the hopper 46 and chute 47, with a guide-opening 55 for the shaft 53. Surrounding the shaft 53, in the hopper 46, is a tube 56 secured to, and closed at its upper end by, the hub 57 of a beveled gear-wheel 58, said hub being journaled in a central bearing 59 in the top of the main frame. The shaft 53 passes loosely through a central opening in the hub 57. Splined to the shaft 53 and resting on the hub 57 is a beveled pinion 60 meshing with a beveled pinion 61 on a shaft 62, which is journaled in the bracket 54 and carries fast-and-loose belt-pulleys 63. Also on the shaft 62 is a beveled pinion 64 engaging and driving the beveled gear 58. The lower end of the chute 47 is closed and opened by a sliding valve 65.

Figure 1:
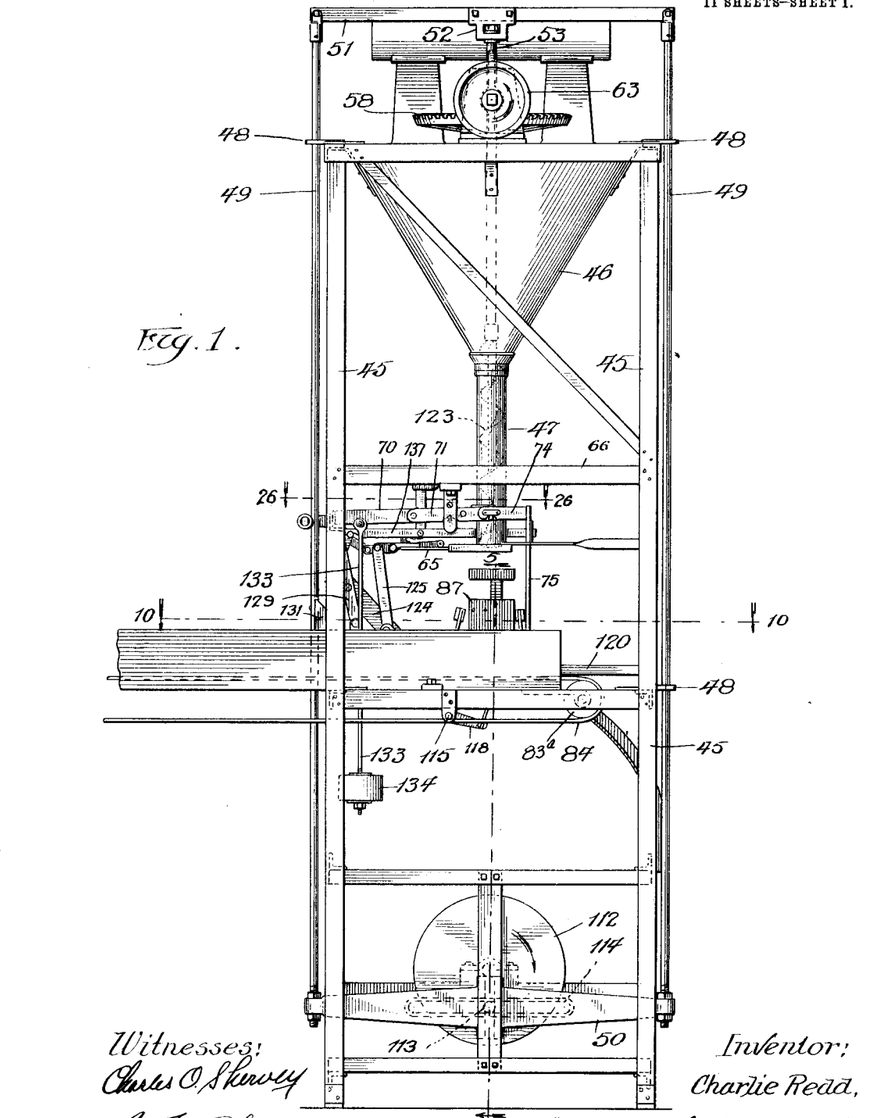
Figure 1 is an elevation of one side of the machine.
Figure 2:
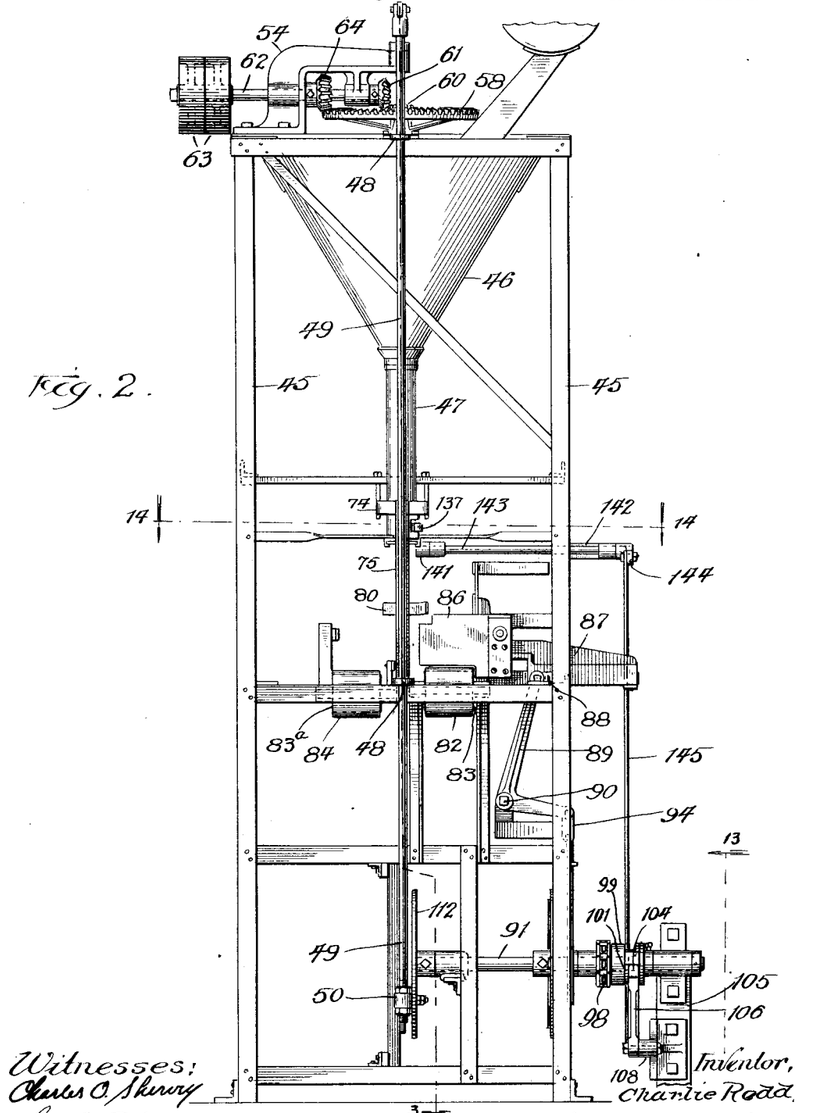
Fig. 2, an elevation of another side.
Figures 3, 4:
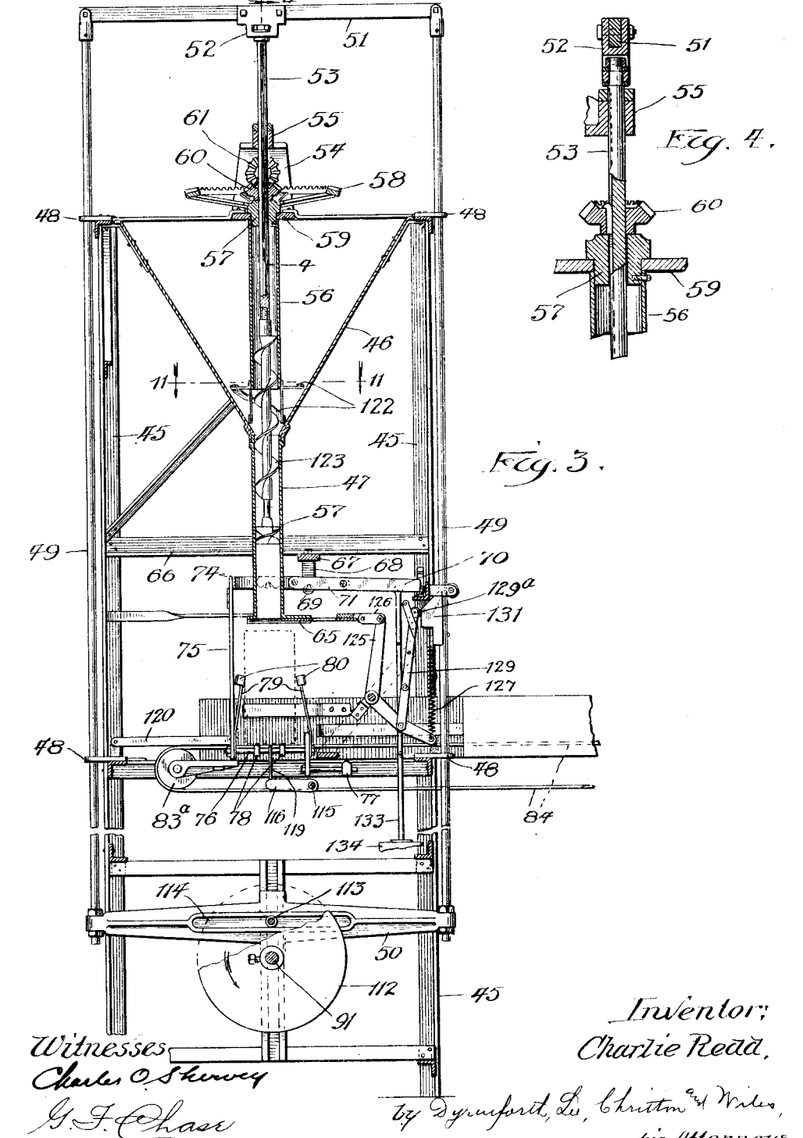
Fig. 3, a section taken on line 3 in Fig. 2.
Fig. 4, an enlarged broken and sectional view taken on line 4—4 in Fig. 3.
Figure 6:
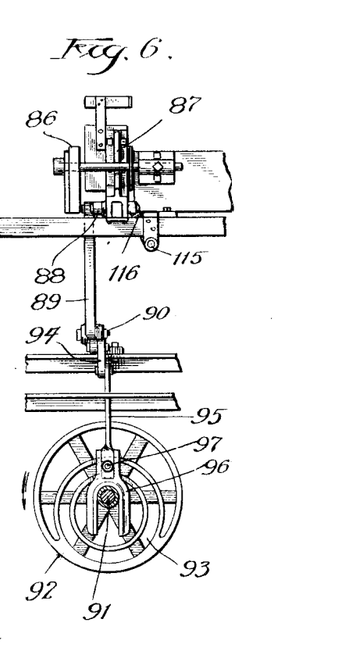
Fig. 6, a sectional elevation taken on line 6 in Fig. 5.
Figures 13, 14, 15, 16, 17, 18, 19:
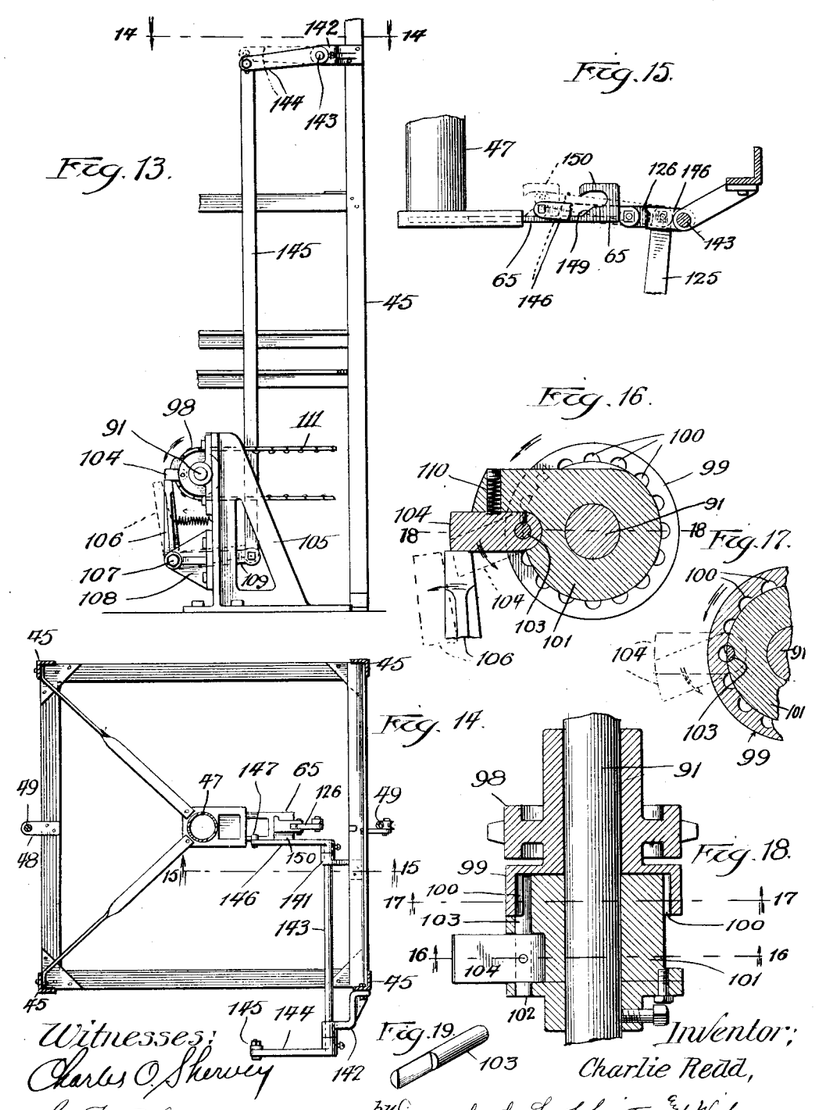
Fig. 13, a broken elevation taken from line 13 in Fig. 2.
Fig. 14, a plan section taken on line 14 in Fig. 2, corresponding with line 14 in Fig. 13.
Fig. 15, an enlarged section taken on line 15 in Fig. 14.
Fig. 16, an enlarged section taken on line 16 in Fig. 5 corresponding with line 16 in Fig. 18.
Fig. 17, a broken section showing the features illustrated in Fig. 16 in another position.
Fig. 18, a section taken on line 18 in Fig. 16.
Fig. 19, a perspective view of a rocking clutch-pin forming one of the details of the mechanism shown in Figs. 16, 17 and 18.
Figures 26, 27, 28, 29, 30, 31, 32:
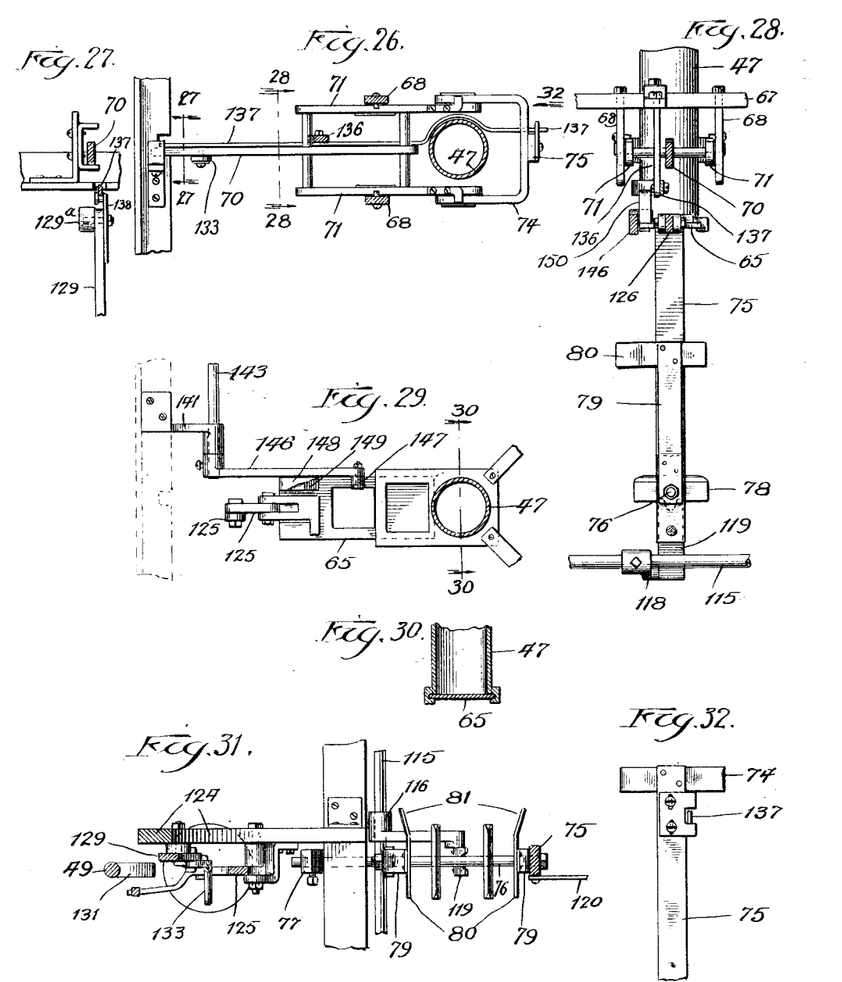
Fig. 26, an enlarged plan section taken on line 26 in Fig. 1.
Figs. 27 and 28, sections taken on lines 27 and 28 in Fig. 26, and viewed as indicated by the arrows.
Fig. 29, a plan section taken on line 29 in Fig. 21.
Fig. 30, a broken section taken on line 30 in Fig. 29.
Fig. 31, a plan section taken on line 31 in Fig. 21 with the carton removed.
Fig. 32, a broken view in elevation of the scale-pan carrying-bar taken in the direction of the arrow 32 in Figs. 21 and 26.

Secured against the cross-brace 66 of the main-frame is a bar 67 carrying a pair of companion hangers or brackets 68 formed with a pair of knife-blade pivots 69, on which is fulcrumed a scale-beam. The scale-beam shown in the main construction consists of a bar 70, and a frame-portion 71 provided in its underside with notches 72 resting on the knife-blade pivots 69 and having the projecting knife-blade pivots 73, on which is mounted an end-yoke 74. Extending downward from the end-yoke 74 is a rod or bar 75 carrying the scale-pan. The scale-pan consists of a rod or bolt 76 secured to the lower end of the bar 75 and carrying an adjustable counter-weight 77 which operates to maintain the scale-pan balanced, in the horizontal plane, from the pivots 73. On the rod 76 is a pair of cross-bars 78 forming the base of the pan; and on the frame of the pan is a pair of upwardly-extending springs or spring-arms 79 at their upper ends carrying guide-strips 80 having flaring end-portions 81, as indicated in Fig. 31. At one side of the scale-pan is an endless traveling belt 82 supported at its end adjacent to the pan, upon a roller 83; and at the opposite side of the scale-pan is an endless traveling conveyer-belt 84 traveling over a roller 83ª (see Fig. 3) supported in line with the roller 83. Each carton 85 is placed, right side up, upon the belt 82 and conveyed thereby to a stop-plate 86 on the frame, whereby it registers with the flaring entrance 81 to the scale-pan. At the outer side of the belt 82, adjacent to the stop-plate 86, is a sliding pusher-head 87 pivotally connected by means of a link 88 (see Fig. 2) with the upper end of a bell-crank lever 89 fulcrumed at 90 on the main-frame. A shaft 91 journaled below the bell-crank lever 89 carries a wheel or disk 92 provided with an eccentric slot or cam-groove 93 (see Fig. 6). Pivotally connected through a link 94 with the bell-crank lever is a connecting-rod 95 having a bifurcated end 96 loosely engaging the shaft 91, and a roller 97 extending into the cam-groove 93. Loosely mounted on the shaft 91 is a sprocket-wheel 98 having a laterally-extending cup-portion 99 (see Fig. 18) the rim of which is formed with an inner annular series of clutch-sockets 100 (see Figs. 16 and 17). Keyed to the shaft 91 is a cylindrical clutch-member 101 provided in one part of its face with a longitudinal groove or socket 102 for a rocking clutch-pin 103 (Fig. 19). Fastened to the clutch-pin is an outwardly-extending finger 104.

The clutch-mechanism shown for producing engagement and disengagement between the sprocket-wheel 98 and shaft 91 is of known construction, that part of the rocking-pin 103, which registered with the sockets 100 of the surrounding sleeve or cup 99 being segmental or semi-cylindrical in cross-section whereby it may be rocked to extend into and out of engagement with any one of the sockets 100 of the cup or sleeve 99. The outer end-portion of the shaft 91 is journaled in a short standard 105 (see Fig. 2), and pivotally mounted on the said standard below the shaft 91 and clutch-member 101 is a swinging-finger or stop 106 movable at its upper end (as shown in Fig. 16) into and out of the path of the finger 104. The finger 106 is upon a rock-shaft 107 (see Fig. 13) journaled in a bracket 108 on the standard 105, the said rock-shaft being provided at one end with a crank-arm 109. A spring 110 (see Fig. 16), pressing against the finger 104, tends normally to turn the latter to the position indicated by dotted lines, whereby the clutch-pin 103 engages with a socket 100 of the cup or clutch-member 99 and clutches the sprocket-wheel 98 to the shaft 91.

Turning of the finger 104 against the resistance of the spring 110 to the position indicated by full lines in Fig. 16 rocks the pin 103 out of clutching engagement with the cup or clutch-member 99. The sprocket wheel 98 is constantly rotated by a drive-chain 111 (see Fig. 13). On the inner end of the shaft 91 is a wheel or disk 112 provided on one side with a stud or roller 113 engaging a longitudinal groove or slot 114 in the cross-head 50 (see Fig. 3).

Figure 5:
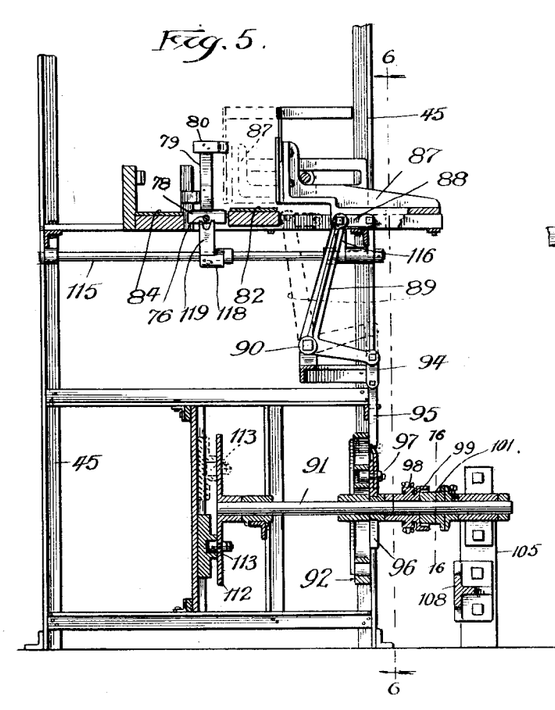
Fig. 5, a section of the lower part of the machine taken on line 5 in Fig. 1.

When the shaft 91 is clutched to the sprocket-wheel 98 and rotated thereby, its cam-wheel 92 reciprocates the connecting-rod 95 to swing the bell-crank lever 89 and reciprocate the pusher 87. In the movement of the said pusher from the position shown by full lines in Fig. 5 to the position shown by dotted lines in that figure, it engages the carton 85, which stands on the belt 82 against the stop-plate 86, and moves it laterally onto the scale-pan between the guides 80, whereby the carton is positioned with its open upper end beneath the chute 47.

Figures 7, 8:
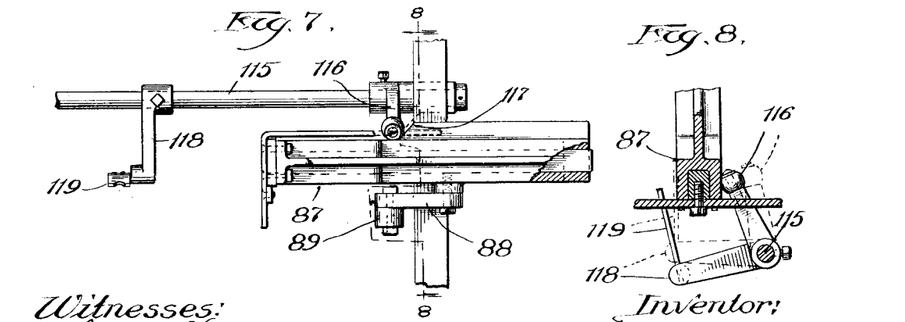
Fig. 7, a broken and enlarged plan view of details of the construction.
Fig. 8, a section taken on line 8 in Fig. 7.
Figure 9:
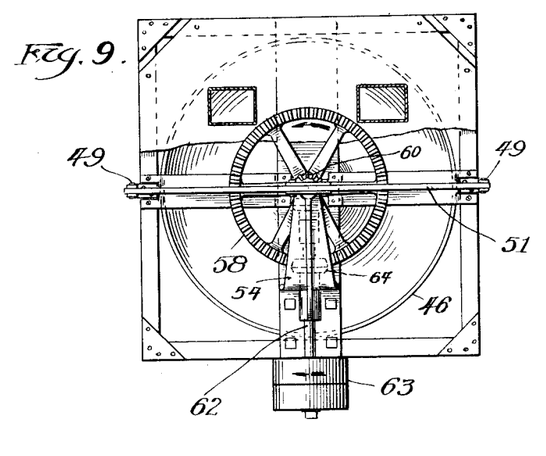
Fig. 9, a partly broken and sectional top plan view of the machine.
Figures 10, 12:
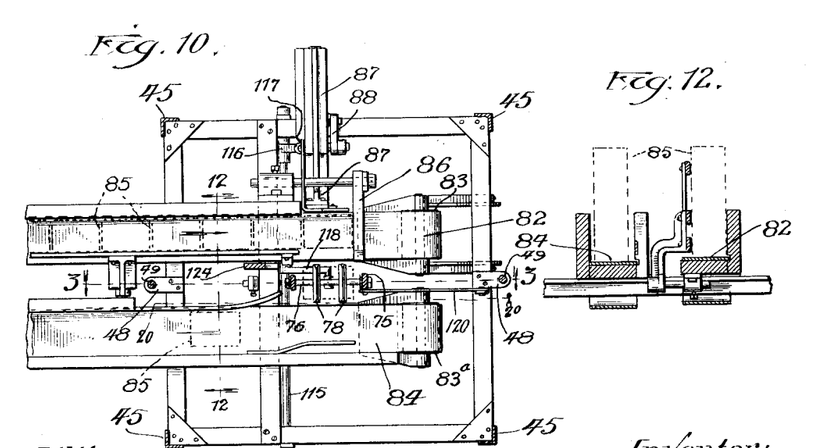
Fig. 10, a plan section taken on line 10 in Fig. 1.
Fig. 12, a section taken on line 12 in Fig. 10.

Journaled in the main-frame below the scale-pan is a rock-shaft 115 provided near its outer end with a roller-equipped crank-arm 116 extending in the path of a cam-shoulder 117 (see Fig. 7) on the pusher 87. On the rock-shaft 115 is a laterally-extending arm 118 carrying a scale-pan steadying-finger 119 having a bifurcated end. When the pusher 87 is moved to transfer a carton from the feed-belt 82 onto the scale-pan, the cam-shoulder 117 of the pusher engages the crank-arm 116 of the rock-shaft 115 and turns the same to swing the finger 119 into engagement at its bifurcated end with the rod 76 of the scale-pan to hold the latter against swinging under pressure exerted by the pusher in positioning the carton. As the shaft 91 completes its rotation and the pusher 87 is retracted, the arm 116 is released and the shaft 115 is permitted to rock and lower the finger 119 out of engagement with the scale-pan. A link 120, pivotally connected at one end with a stationary bracket 121 and at its opposite end with the scale-pan carrying-bar 75, operates to steady the scale-pan against swinging (to the right or left in Fig. 20) on the pivots 73.

Figure 11:
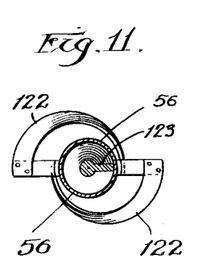
Fig. 11, an enlarged plan section taken on line 11 in Fig. 3.

The shaft 62 is rotated continually by a belt (not shown) which drives the pulley 63. In the rotation of the shaft 62 the bevel-pinion 61 turns the shaft 53 continuously. The tube 56 is also rotated continuously by the engagement of the pinion 64 with the gear 58. Carried by the lower end of the tube 56 in the hopper 46 is a pair of spirally-disposed blades 122 (see Fig. 11) which tend to stir and feed the merchandise contained in the hopper down into the chute 47; while a spiral-blade or worm 123 on the shaft 53 tends to force the merchandise downward in the chute 47. The spiral head 57 also tends to feed the merchandise downward in the chute, and pack it against the valve 65 when the latter is closed.

Figure 20:
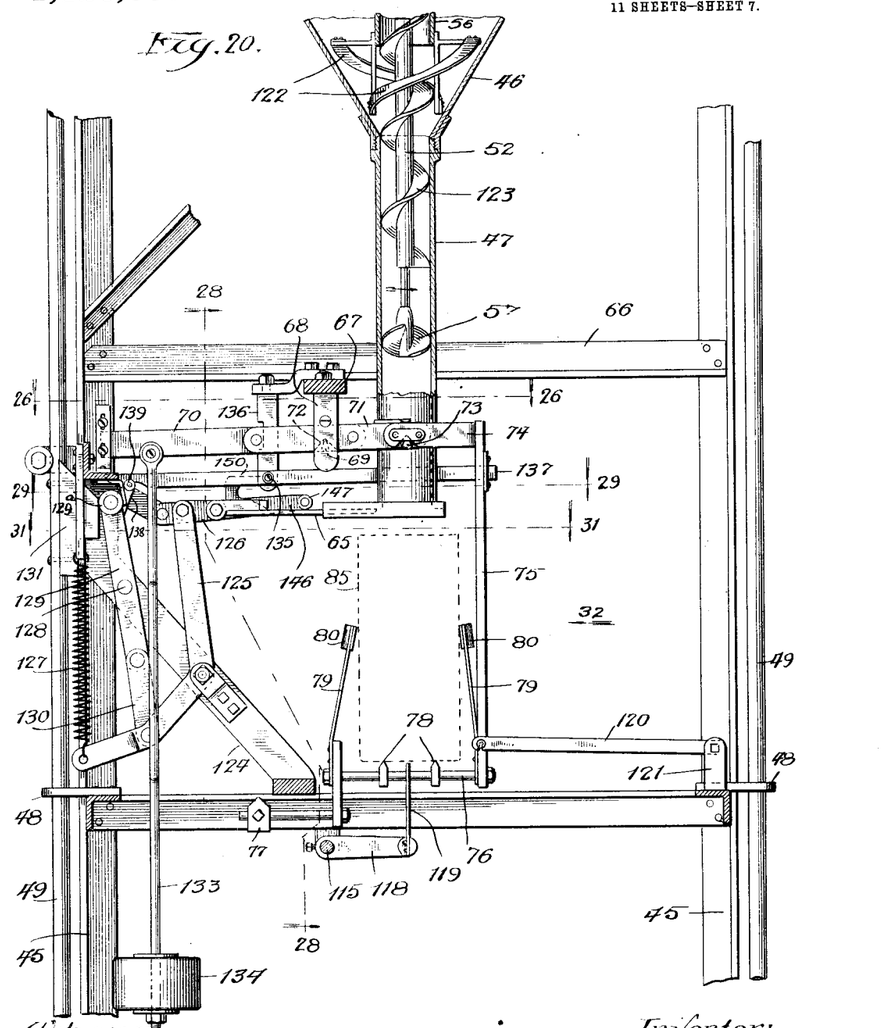
Fig. 20, a broken and enlarged partly-sectional view of the features illustrated in Fig. 3, the view being taken from the opposite direction and showing the relative positions of the moving parts previous to or at the beginning of a carton-filling and weighing operation.
Figures 21, 22, 23, 24, 25:
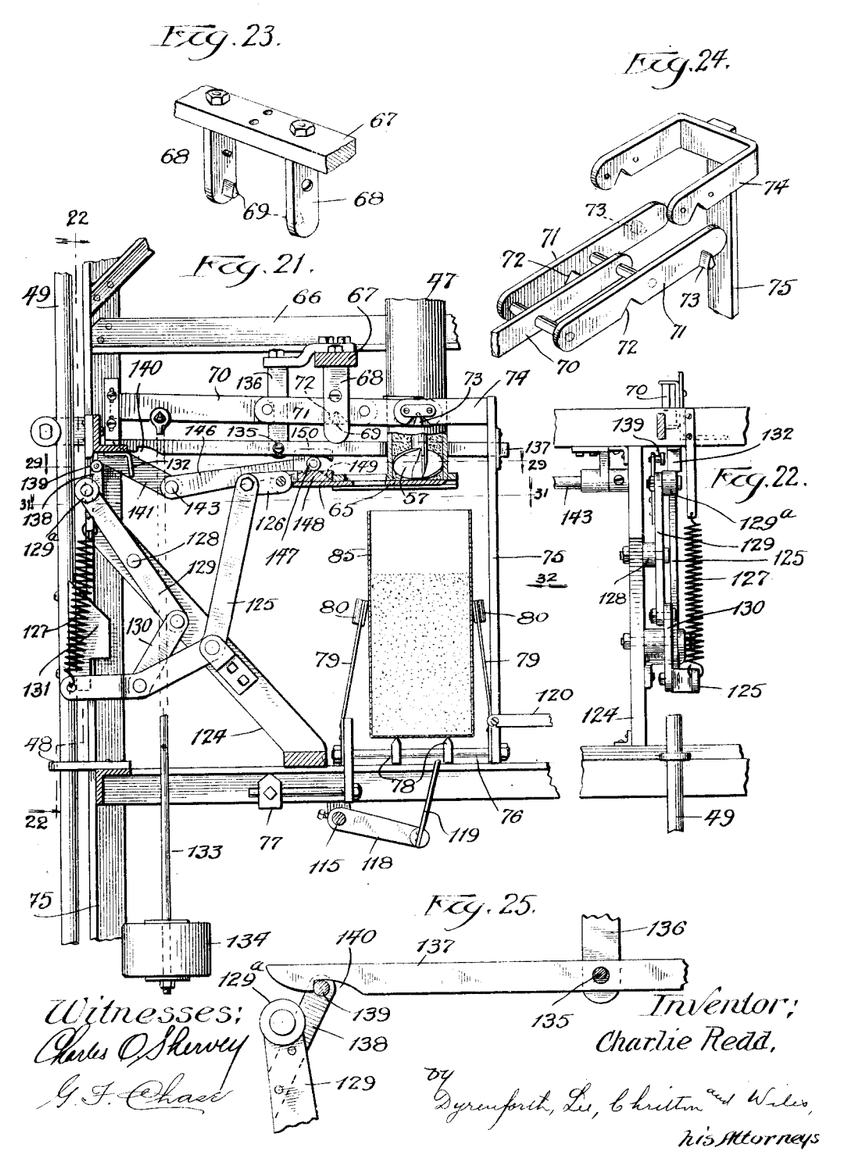
Fig. 21, a view of the same features as those illustrated in Fig. 20, showing the moving parts as they appear at the end of a carton-filling operation.
Fig. 22, a broken and partly sectional elevation taken on irregular line 22 in Fig. 21.
Figs. 23 and 24, enlarged, broken and perspective views of details of construction of the weighing mechanism.
Fig. 25, a broken elevation of another detail of the weighing mechanism.

Forming part of the stationary or main frame of the machine is an inclined brace-bar 124 (see Figs. 20 and 21) on which is fulcrumed a valve-opening and closing bell-crank lever 125, one arm of which is connected by means of a pivotal link 126 with the valve 65. A spring 127 tends normally to swing the bell-crank lever and close the valve 65, as shown in Fig. 21. Fulcrumed at 128 on the bar 124 is a lever 129 connected through a pivotal link 130 with an arm of the bell-crank lever 125. At its upper end the lever 129 carries a roller 129ª in the path of a cam-block 131 carried by one of the rods 49. The block 131 has an upper inclined cam-face, as shown. When the cross-head 50 is raised by the wheel 112, the rods 49 are raised, causing the cam-block 131 to engage the roller 129ª and move it against a stationary stop 132. This swings the lever 129 from the position shown in Fig. 21 to that shown in Fig. 20, causing it to extend the link 130 and swing the bell-crank lever 125 on its fulcrum, against the resistance of the spring 127 to open the slide-valve 65. Hanging from the bar 70 of the scale-beam is a rod 133 carrying the scale-beam weight 134.

The mechanisms thus far described are timed with relation to each other to operate as follows: The valve 65 is normally closed and remains so while the scale-pan is depressed and while a filled carton is being removed and an empty carton is being placed upon the scale-pan. The turning of the worm-shaft 53 and tube 56 from the shaft 62 causes merchandise from the hopper 46 to be crowded down against the closed valve 65, filling the space in the tube 47 below the plunger-head 57 with merchandise nearly sufficient in weight to charge a carton 85 to its intended capacity. When the cross-head 50 and attendant parts are near the limit of their rise, the cam-block 131, by turning the lever 129, as before described, starts opening movement of the valve 65, said opening movement being completed when the cross-head 50 and parts carried thereby reach their highest level. In the descent of the cross-head 50 and attendant parts, the shaft 53 is thrust downward, causing the head 57 to discharge the material beneath it in the tube 47 into the positioned carton 85, thereby filling the latter nearly to its intended capacity, that is to say, nearly, but not quite, to the resistance of the weight 134. The continued rotation of the screw-shaft 53 on its head 57 causes the flow of the merchandise in an uninterrupted stream continuous from the first opening of the valve until the carton and its contents press down the scale-pan upon which the valve is again closed in practice. Thus the present device operates on the principle of the continuous and unbroken feed from first to last, but owing to the husbanding of the continuous feed during the shifting of the cartons while the valve is closed, the actual flow of material into the cartons is more rapid for the first instant after the opening of the valve than after the accumulated material has been discharged.

Pivoted between its ends upon a pin 135 (see Fig. 25) carried by a stationary hanger 136, is a lock-bar 137, which, as shown in Fig. 26, is curved around the side of the chute 47 to clear the latter, and at its end pivotally engages the scale-pan carrying-bar 75. On the upper end of the lever 129 is a laterally-bent finger 138 carrying a roller 139 adapted to engage with a notch 140 in the underside of the adjacent end of the lock-bar 137, when the same is depressed by the rise of the scale-pan. When the lever 129 is extended by the cam-block 131 to the position shown in Fig. 20 to open the valve 65, as before described, the roller 139 is engaged by the notch 140 in the release-bar, and the lever 129 is thus held with the link 130 extended to prevent turning movement of the bell-crank lever 125, by its spring 127, to close the valve 65. When the carton 85 has been charged with merchandise sufficient to press down the scale-pan, the downward movement of the latter turns the release-bar 137 on its pivot 135, and raises its notch 140 to disengage the roller 139, whereby the lever 129 is released and moved with the bell-crank lever and attendant parts by the spring 127 to the position shown in Fig. 21, closing the valve 65 and cutting off further flow of merchandise into the carton.

Journaled toward one end in a stationary bracket 141 (see Figs. 2, 13, 14 and 21), and toward its opposite end in a bearing 142 is a rock-shaft 143 provided beyond the bearing 142 with a crank-arm 144. Pivotally connected at its upper end with the crank-arm 144 is a vertically-extending rod 145 pivotally connected at its lower end with the crank-arm 109 (see Fig. 13). The rock-shaft 143 carries an arm 146 provided at its free end with a roller 147 which rests on the slide-valve 65. Forming part of the slide-valve and movable therewith is a cam-block 148 having a beveled end 149 (see Fig. 21) and having an upwardly-extending hook-portion 150. The purpose of the rock-shaft 143 and attendant features is to stop the rotation of the shaft 91 and the movement of the parts actuated thereby during the necessarily somewhat variable and unpredeterminable periods of time in which cartons 85 are being finally filled and weighed, and to start those parts into operation again when the weighing operation is completed. While the valve 65 is open, as shown in Fig. 20, the arm 146 rests in its lowered position upon the valve 65, and the shaft 143 is rocked to the position of depressing the crank-arm 144, rod 145 and crank-arm 109 to hold the swinging stop or finger 106 in engagement with the clutch finger 104, whereby the shaft 91 is released from the sprocket-wheel 98, as before described, and remains inactive. In the closing movement of the valve 65, which is its movement from the position shown in Fig. 20 to that shown in Fig. 21, its cam-block 148 engages and lifts the roller 147, thereby raising the arm 146 and rocking the shaft 143 to raise the crank-arm 144, rod 145 and crank-arm 109 and swing the stop 106 to the position indicated by dotted lines in Fig. 13, whereby it releases the clutch-finger 104 and causes the clutch-pin 103 to engage with one of the clutch-sockets 100 of the cup 99 and cause the shaft 91 to rotate with the sprocket-wheel 98.

It will be understood from the foregoing description that in the operation of the machine the cartons to be filled are placed upon the traveling belt-conveyer 82 and carried thereby to the stop-plate 86. While the shaft 91 is rotating, the pusher 87 is actuated intermittingly to transfer the carton to be filled from the belt 82 onto the scale-pan. In the movement of a carton onto the scale-pan, it forces the previously-filled carton from the scale-pan onto the conveyer-belt 84, whereby the filled carton is carried out of the machine. While the cartons are being moved onto and off of the scale-pan, the latter is steadied, as described, by the engagement with the scale-pan rod 76 of the rocking-stop or finger 119. As soon as a carton 85 is positioned on the scale-pan, the valve 65 is opened by the rise of the cross-head 50 and the rods 49, as described, and held in open position by the engagement of the release-bar 137 with the roller 139 on the lever 129. During the rise of the cross-head 50, rods 49 and cross-head 51, the rotating-shaft 53 is raised through the pinion 60 and guide 55 to the elevated position shown in Fig. 3, and in the subsequent descent of the said parts the head 57 forces the merchandise beneath it in the chute 47 into the positioned carton, and by its continued rotation maintains thereafter the unbroken stream of merchandise until the carton and contents press down the scale-pan and release the valve-closing lever-mechanism by rocking the release-bar 137, as described. By reason of the fact that the time consumed in filling a carton with the desired weight of merchandise may vary in each instance, it is necessary to time the operations of the machine therewith, and this necessitates the stopping and a starting of the shaft 91 and parts actuated thereby, at each carton-filling operation. When the scale-pan descends under the weight of a filled carton, the shaft 91 starts to rotate owing to the rocking of the shaft 143 and raising of the clutch releasing-rod 145 effected thereby, as described, causing the pusher 87 to place an empty carton on the scale-pan and transfer the previously-filled carton onto the discharge-belt 84. The shaft 53 and tube 56 are rotated constantly, as described, whereby the feed is maintained constant and the material feed is husbanded in the chute 47 while the valve 65 is closed and is discharged into the carton in the manner described when the valve is open.

Figure 33:
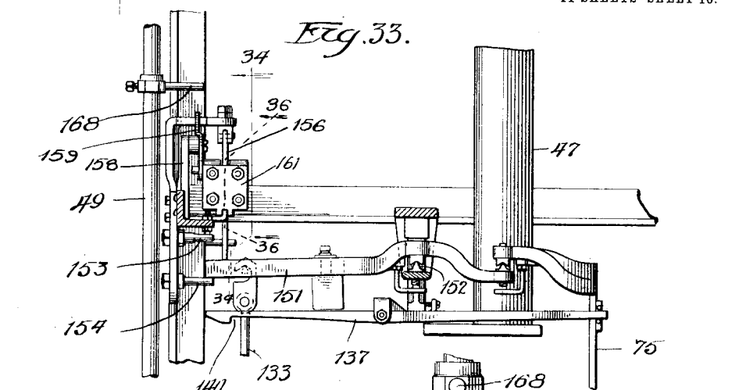
Fig. 33, a view corresponding more especially with Fig. 20, and showing a modified construction of the weighing and release mechanisms.
Figures 34, 35, 36:
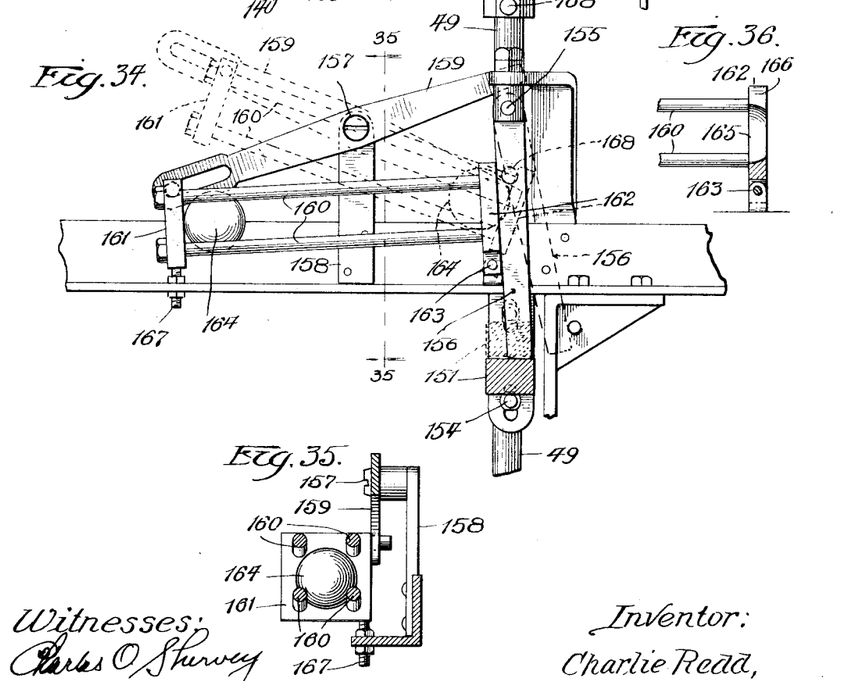
Fig. 34, a section taken on line 34 in Fig. 33.
Fig. 35, a section taken on line 35 in Fig. 34.
Fig. 36, a broken section taken on line 36 in Figs. 33 and 37.
Figure 37:
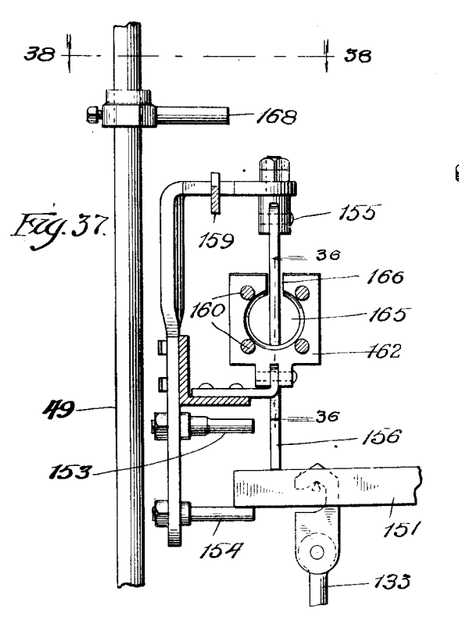
Fig. 37, an enlarged view of features of the modified construction.
Figure 38:
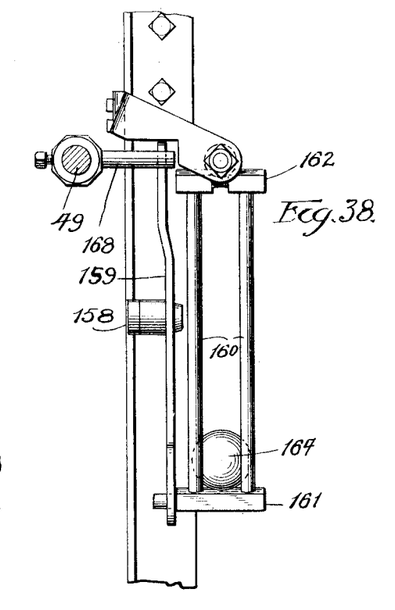
Fig. 38, a section taken on line 38 in Fig. 37.
Figures 39, 40, 41:
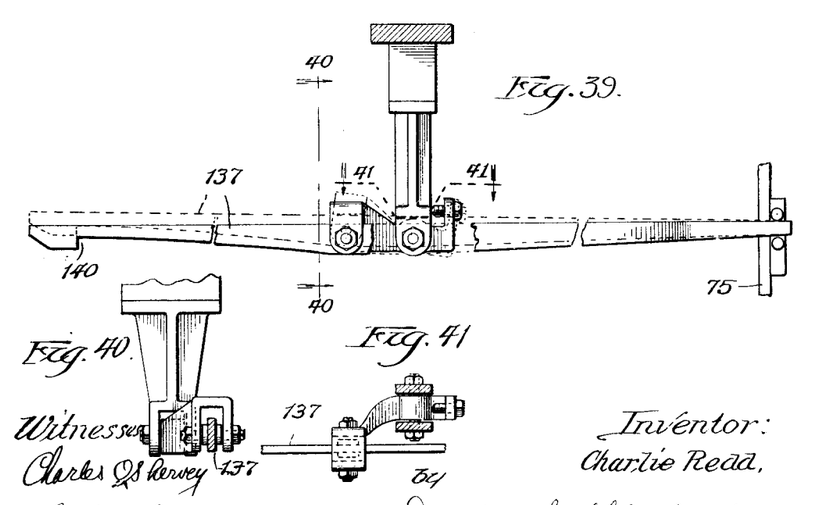
Fig. 39, a partly broken and sectional view showing the release-bar feature of the modified construction.
Fig. 40, a broken sectional view taken on line 40 in Fig. 39.
Fig. 41, a broken plan section taken on line 41 in Fig. 39.

In the modified construction, illustrated in Figs. 33 and 34 and those that follow, a somewhat differently patterned, though similarly operating, scale-beam is shown, and other means from that above described is shown for steadying the scale-beam during the carton-positioning, filling and discharging operations. The scale-beam 151, of the modified construction, is fulcrumed upon the knife-blade pivot 152, to swing between the upper and lower stop-pins 153, 154. Pivoted at 155 is a vertically-swinging latch or prop 156 adapted to engage and hold down the scale-beam 151. Fulcrumed at 157 on a stationary bracket 158 is a lever 159. The reference numeral 160 designates an oblong cage formed of four parallel rods, as shown, fastened to end-plates 161 and 162. The cage is pivotally mounted at its end-plate 162 upon a stationary pivot-pin 163 and has a sliding pivotal connection at its end-plate 161 with the lever 159. Running in the cage is a ball 164, and the end-plate 162 is provided with a central opening 165 of somewhat smaller diameter than the ball and a slot 166 adapted to pass over and receive the latch 156. Normally the cage 160 rests at its end-plate 161 on a stop 167, whereby it inclines in the direction away from the latch, with the ball 164 against the end-plate 161. The lever 159 extends into the path of a finger 168 carried by the adjacent rod 49. When the scale-beam 151 is in its normal position against the stop-pin 154, the latch 156 engages it and operates to hold it in that position to steady it during the initial charging of merchandise into the positioned package or carton 85. In the further descent of the cross-head 50 and attendant parts, after the plunger-head 157 has deposited the initial portion of the charge of merchandise in the package or carton, as described, the finger 168 on the rod 49 engages the lever 159 and swings the same on its fulcrum to turn the cage from normal position to that shown by dotted lines in Fig. 34, causing the end-plate 162 to pass at its slot 166 over the latch and the ball 164 to be rolled to the end-plate 162 whereby it strikes forcibly against the latch and swings the same out of engagement with the scale-beam. Thus, shortly after the flow into the carton begins, the scale-beam is released so that the weighing operation may be performed. In the descent of the scale-pan at the end of the weighing operation, the release-bar 137 is actuated, as before described and for the purpose set forth.

In practice, it is possible to feed the cartons quite rapidly to filling position, for the reason that the feed goes on continuously and at a substantially even speed into the chute, whether the same be open or closed, and thus the only limit to the speed at which cartons can be filled is the rapidity with which an unbroken stream can be fed without interfering with the accuracy of the weight. In other words, the feed into the chute can be made as rapid as would be possible if the cartons could be removed from and replaced on the scale-pan in a mathematical instant; for during the period when the cartons are being shifted, the valve is closed, but the feed is accumulating for the next carton, which should reach its position before sufficient material has accumulated in the chute to reach the normal weight of the load, and in practice the parts will be timed so that the valve will be safely opened prior to the accumulation of the normal load of the chute. This method of feeding material in a machine of this character is believed to be most important. Another point of great importance is the fact that the feeding device is of such a construction as positively to force out of the chute the accumulated material therein contained. In the past, great difficulty has been experienced in arranging any reservoir for material in which an accumulation could take place for subsequent discharge, by reason of the fact that certain classes of material had a tendency to arch across the reservoir, or stick to the sides thereof, so that when the reservoir was opened, the discharge failed to take place, and the subsequent operations of the machine depending upon the load being discharged, the machine stopped. In the present device, the screw-shaft feeds the material by its rotation, and with certain classes of material this one movement might be sufficient, but its vertical motion gives it another function, in that it positively forces out of the chute all accumulations and breaks any arch which might occur. As a result, the present device has been found in practice to be very satisfactory in the handling even of flour, a material which when accumulated in a reservoir like the present chute is ordinarily very difficult to discharge.

The steadying of the scale-beam and scale-pan for a short period after the valve is open is of importance because it prevents the shock of the first rapid flow of material into carton, and the momentum of the charge, which falls in large quantity and through a considerable distance, very prematurely tripping the beam. The mechanism for starting and stopping the operating machinery is also of importance, because it is important that all the filling operations should be performed in the same time, and it is therefore highly desirable, if not absolutely necessary, that the cycle of operation should be started anew each time a carton is completely filled.

The foregoing description is intended to convey a clear understanding of my improvements in what I now believe to be the best form of their embodiment, and no undue limitation should be understood therefrom. It is my intention to claim all that is novel in my invention, and that the claims shall be construed as broadly as the prior state of the art may warrant.

What I claim as new and desire to secure by Letters Patent is:

1. In combination, a scale-pan to receive a carton, carton-shifting means, a chute to discharge into a carton on the scale-pan, means to feed material continually to the chute, and a valve for the receptacle arranged to close upon the movement of the scale-pan and to open upon a subsequent operation of the carton shifting means.

2. In combination, a scale-pan to receive a carton, carton-shifting means, a chute to discharge into a carton on the scale-pan, means to feed material continually to the receptacle, a valve for the mouth of the chute, means controlled by movement of the scale-pan for closing the valve, and means operated by the carton-shifting means for opening the valve.

3. In combination, a scale-pan to receive a carton, carton-shifting means, a chute to discharge into a carton on the scale-pan, means to feed material continually to the receptacle, a valve for the mouth of the chute, means controlled by movement of the scale-pan for closing the valve and for initiating movement of the carton-shifting means, and means operated by the carton-shifting means at the completion of its action for opening the valve.

4. In a package filling and weighing machine, a scale-pan upon which the package is positioned, constantly-operated material-feeding means, package-shifting means, and means to husband the continuously-fed material during the shifting of the packages from and to the scale-pan and to discharge the husbanded material into the fresh package when positioned.

5. In a package filling and weighing machine, a scale-pan, package-shifting means, continuously-operating material-feeding means, and means to guide the flow from the material-feeding means to a package while in position on the scale-pan and to husband the flow therefrom while the cartons are being shifted.

6. In a package filling and weighing machine, a material-receiving and guiding-chute interposed in the path of the material to the package, means having a vertical axis adapted to continuously feed material to said chute and an intermittently-operated valve therefor controlled in its movement by the weight of the package, whereby the chute, when the valve is closed, operates to husband the flow of material for subsequent discharge.

7. In a package filling and weighing machine, a scale-pan, continuously operating material-feeding means, a single means to guide the flow to a package on the scale-pan and to husband the flow during the shift of packages and to discharge the husbanded material, and means operating to steady the weighing mechanism during the first part of the flow of the material into the package.

8. In a package filling machine, a chute to receive the flow and guide the flow to the package to be filled, means to open the chute, a scale-beam adapted to support the package to be filled, means operated by the movement of the beam for closing the receptacle, and means operating upon the opening of the chute for positively forcing out the accumulated contents thereof.

9. In a package filling machine, a chute, weighing means beneath the receptacle to receive the package to be operated upon, means operated by the weighing means for closing the receptacle, means to open the receptacle after a carton is positioned thereon and a material-feeding device having a composite movement, one to feed material, and the other operating when the chute is opened positively to discharge its contents.

10. In a package filling and weighing machine, a receptacle, means to open the chute, weighing means beneath the receptacle to receive the package to be filled, means operated by the weighing means for closing the receptacle, a spiral feeding-device, means to rotate the feeding-device to feed material to the chute, and means bodily to reciprocate the feeding-device positively to discharge the contents of the chute when opened.

11. In a package filling and weighing machine, the combination of driving mechanism, a scale-pan on which the package is positioned, a merchandise-chute above the scale-pan, a valve in the chute, opening and closing means for the valve actuated from said driving mechanism, a merchandise feeder in the chute, means for rotating said feeder to collect merchandise in the chute, against the valve while closed, reciprocating means for the feeder actuated from said driving mechanism to positively force said charge from the chute when the valve is opened, the continued rotation of the feeder operating to continue the feed to the package to make up the weight necessary to depress the scale-pan, and means actuated by the descent of the scale-pan to bring about closing movement of said valve.

12. In a package filling and weighing machine, the combination of driving mechanism, a scale-pan, a traveling conveyer for moving the package into the machine, a pusher actuated by the driving mechanism to move the package from the conveyer and position it on the scale-pan, a merchandise-chute above the scale-pan, a merchandise-conveyer in the chute operating to fill the positioned package, and a discharge-conveyer for the filled package.

13. In a package filling and weighing machine, the combination of driving mechanism, a feed-chute, a scale-pan beneath said chute on which the package is positioned, a vertically-reciprocating frame actuated by the driving mechanism, a merchandise-feeding worm-shaft in the chute carried by said frame, a spiral-head on the lower end of said worm-shaft, means for rotating said worm-shaft, a valve in the lower end-portion of said chute, and opening and closing means for said valve.

14. In a package filling and weighing machine, the combination of driving mechanism, a feed-chute, a scale-pan beneath said chute on which the package is positioned, a vertically-reciprocating frame actuated by the said driving mechanism, a merchandise-feeding worm-shaft in the chute carried by said frame, a spiral head on the lower end of said worm-shaft, means for rotating said worm-shaft, a valve in the lower end-portion of said chute, opening and closing means for said valve, and means actuated by movement of said valve for stopping and starting the reciprocating movement of said frame.

15. In a package filling and weighing machine, the combination of a drive-shaft, a feed-chute, a scale-pan beneath said chute on which the package is positioned, a vertically-reciprocating frame operatively connected with said drive-shaft, a merchandise-feeding worm-shaft on said frame extending downward in the chute, a spiral head on the lower end of said worm-shaft, rotating means for the worm-shaft, a valve in the lower end-portion of said chute, and a valve-operating means actuated by said reciprocating frame.

16. In a package filling and weighing machine, the combination of a drive-shaft, a feed-chute, a scale-pan beneath said chute on which the package is positioned, a vertically-reciprocating frame operatively connected with the drive-shaft, a merchandise-feeding worm-shaft on said frame extending downward into the chute, a spiral head on the lower end of the worm-shaft rotating means for the worm-shaft, a spring-closed valve in the lower end-portion of said chute, valve-opening means actuated by said reciprocating-frame in its upward movement, and means timing the closing movement of said valve actuated by the descent of the scale-pan under the weight of the filled package.

17. In a package filling and weighing machine, the combination of driving mechanism, a feed-chute, a scale-pan beneath said chute on which the package is positioned, a vertically-reciprocating frame actuated by said driving-mechanism, a merchandise-feeding worm-shaft in the chute carried by said frame, a spiral head on the lower end of said worm-shaft, rotating means for said worm-shaft, a spring-closed valve in the lower end-portion of said chute, valve-opening means actuated by the movement of said valve in the upward direction, catch mechanism operating to hold the valve open, and catch-releasing means actuated by movement of the scale-pan under the weight of a filled package.

18. In a package filling and weighing machine, the combination of driving mechanism, a feed-chute, a scale-pan beneath said chute on which the package is positioned, a vertically-reciprocating frame actuated by said driving mechanism, a merchandise-feeding worm-shaft in the chute carried by said frame, a spiral head on the lower end of said worm-shaft, rotating means for said worm-shaft, a spring-closed valve in the lower end-portion of said chute, a valve-opening lever in the path of said frame to be actuated by the movement thereof in the upward direction, and a pivotal bar, operatively connected with the scale-pan, serving to engage said lever and hold the valve open, and to release the lever when moved by descent of the scale-pan under the weight of a filled package to permit closing of the valve.

19. In a package filling machine, in combination, a chute adapted to be periodically filled and emptied, having a discharge opening, a valve for said opening and means continuously operating to feed material to said chute and intermittently operating to bodily discharge the contents of said chute when said valve is opened.

20. In a package filling machine, in combination, a chute adapted to be periodically filled and emptied, having a discharge opening, a valve for said opening, means continuously operating to feed material to said chute and means intermittently operating to bodily discharge the contents of said chute when said valve is opened.

21. In a package filling machine, in combination, a chute interposed in the path of the material to the package, a valve for said chute and continuously operating means adapted to accumulate under pressure the material in the chute for subsequent discharge when the valve is opened.

22. In a package filling machine, in combination, a chute adapted to be periodically filled and emptied, having a discharge opening, an intermittently operating valve for said opening, means for continuously feeding material to said chute, and means adapted to cause a relative movement between said feeding means and said chute.

23. In a package filling machine, in combination, a chute, means adapted to feed material thereto, and means adapted to cause a relative reciprocative movement between said feeding means and chute to discharge the contents of said chute.

CHARLIE REDD.

In the presence of—
 NELLIE B. DEARBORN,
 OTTILIE C. AVISUS.

Copies of this patent may be obtained for five cents each, by addressing the "Commissioner of Patents, Washington, D. C."